N. J. HARRINGTON.
NON-REFILLABLE CANISTER.
APPLICATION FILED SEPT. 18, 1907.
925,633.
Patented June 22, 1909.
2 SHEETS—SHEET 2.
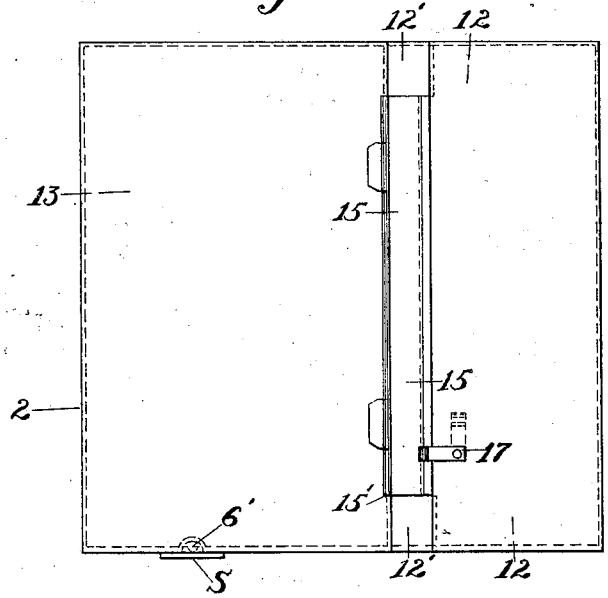
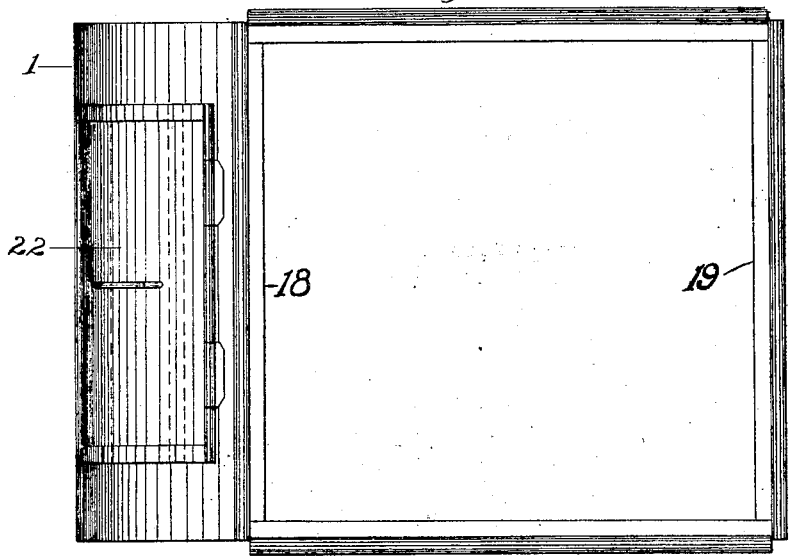
Witnesses:-
Inventor:-
Neil J. Harrington
By Albert H. Merrell
His Atty.

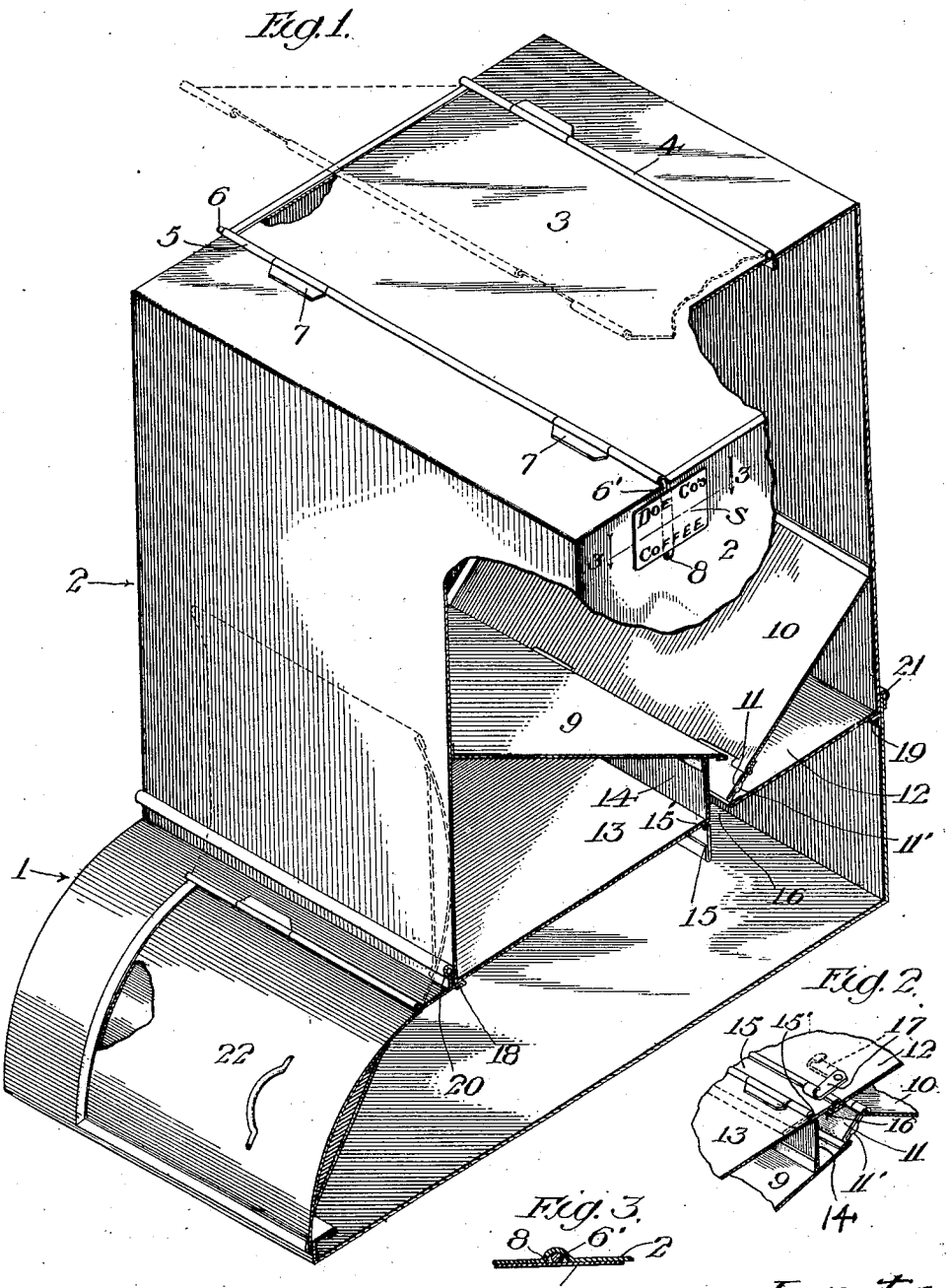

UNITED STATES PATENT OFFICE.

NEIL J. HARRINGTON, OF LOS ANGELES, CALIFORNIA, ASSIGNOR TO HAAS, BARUCH AND COMPANY, OF LOS ANGELES, CALIFORNIA, A CORPORATION OF CALIFORNIA.

NON-REFILLABLE CANISTER.

No. 925,633.          Specification of Letters Patent.          Patented June 22, 1909.

Application filed September 18, 1907. Serial No. 393,568.

*To all whom it may concern:*

Be it known that I, NEIL J. HARRINGTON, a citizen of the United States, residing at Los Angeles, California, have invented a new and useful Non-Refillable Canister, of which the following is a specification.

This invention relates more particularly to portable non-refillable cans or chests for coffee in the grain, but includes a non-refillable receptacle adapted to contain granular material in general.

Among wholesale houses engaged in the business of supplying coffee to retail dealers, it is customary for the wholesale dealers to furnish the retail dealers with a receiving bin which remains permanently in the hands of the retailer. In connection with the receiving bin, a feeding receptacle is provided which is adapted to set upon the receiving bin and deliver coffee thereto as the same is withdrawn from the receiving bin to supply the customer of the retail merchant. When these feeding receptacles become empty, the wholesaler calls for them and refills them with coffee of his own brand. Hitherto, much annoyance has been caused the wholesale dealer by reason of the retail merchants refilling the feeding receptacle with coffee or other articles not supplied by the wholesaler who owns the feeding receptacle.

It is an object of this invention to provide a non-refillable receptacle or feeder to be used in connection with the receiving bins so that it will be difficult or impossible for the retailer to make use of such receptacles without patronizing the wholesaler to whom they belong, it being understood that the wholesaler has facilities for opening and refilling the feeding receptacle, not possessed by the retailer.

Referring to the accompanying drawings which illustrate the invention,—Figure 1 is a perspective view partly in section of the receiving bin showing the non-refillable receptacle seated thereon. Fig. 2 is an inverted sectional perspective view of the means for preventing the receptacle from being refilled. Fig. 3 is a section detail on line 3—3 of Fig. 1. Fig. 4 is a bottom view of the feeding receptacle. Fig. 5 is a plan view of the receiving bin.

Upon a receiving bin 1, is a detachably mounted, feeding receptacle 2 having a lid 3 hinged at 4 and provided at its free end with a curled lip 5 adapted to receive a fastening rod 6, which passes through keepers 7 formed on the top of feeding receptacle 2. Receptacle 2 is indented or grooved at 8 to receive an end portion 6' of fastening rod 6, said portion being bent at right angles to the body portion of said rod. When the feeding receptacle has been filled, the door 3 is closed and fastened shut by means of rod 6, the extension 6' of said rod being seated in the indented portion or groove 8 and soldered in the said groove. A seal *s* bearing the brand of the company supplying the coffee or other material may now be placed across the groove 8 and extension 6' in order to make it impossible to open the lid without detection.

Referring now to the construction of the non-refillable outlet for delivering material from the feeding receptacle to the receiver,— the feeding receptacle 2 may be provided with oppositely disposed plates 9 and 10 which slope downwardly toward the center and which are spaced apart at their lower edges to leave a feeding slot. Plate 10 extends to a point somewhat below plate 9, said plate 10 having hinged to its lower edge a flap 11 which rests on a floor portion 12 of the bottom of the feeder as shown in Fig. 1 when the feeder is in an upright position. On the other side of the feeding slot, the bottom portion 13 of the feeder is provided with an upward extension 14 which extends upwardly to the sloping plate 9 as shown to complete the feeding chute.

15 is a closure hinged at 15' to the bottom of feeder 2 at one side of the slot 16 in the bottom thereof.

17 is a button or latch for fastening closure 15 in the closed position so that the material in the feeder will not escape while the feeding receptacle is being transported from place to place.

Fig. 2 shows the position of the flap 11 when the feeder 2 is inverted, said flap having fallen down so that the feeder cannot be refilled. Flap 11 may be weighted by metal strip 11' in order to make it more positive in operation.

18 and 19 are shoulders, desirably formed by an internal sheet metal ledge extending around the top of bin 1, upon which receiver 2 rests within the flanged portions 20 and 21.

22 is the usual door in the receiving bin to provide for the insertion of a scoop.

Upright plate 14 and the portions of plates 12 and 13 adjacent thereto form guarding means which render it difficult to open flap 11 if an attempt is made to refill the can.

It will be understood that the can must be held in an approximately inverted position in an attempt to refill it through slot 16, and that, when in such position flap 11 will close as shown in Fig. 2.

It will be noted that the receptacle 2 in the embodiment of the invention illustrated in the drawings consists of a box of uniform extent in plan section, the bottom of said box being removably seated on top of the receiving bin and discharging when thus seated into said bin through the non-refillable bottom opening 16. The slotted bottom of box 2 subtends substantially the entire plan-sectional area of said box, and therefore forms a stable means for seating said box upon the receiving bin and permits the use of a long discharge slot which is illustrated in the drawings as extending across the greater portion of the width of the canister, but it is to be understood that the slot may be longer if desired. By reason of the bottom of the feeding receptacle 2 being free from any external attachments excepting the flap 15, which is readily deflected by the descending material, the interior of the receiving bin 1 is left free from fixed parts and therefore practically unobstructed when feeding receptacle 2 is located in operative position. Upright wall 14 closes the space between the lower portion of upper plate 9 and its adjacent edge and the adjacent edge of slot 16 near 15', said upper plate projecting at its free edge across the top of said wall 14. Guarding flap 11 is pivoted to lower edge of plate 10 at a point above the bottom of box 2, said flap normally bridging the space between lower end of plate 10 and the bottom plate 12 at that side of the slot. Said flap 11 swings against the above-mentioned projecting portion of upper plate 9 to prevent refilling when the box is inverted. Portions 12' may be left intact at the ends of the slot to strengthen the bottom of the canister. In Fig. 4 said portions 12' are shown as small plates soldered in place to connect the bottom plates 12 and 13, but it is to be understood that the specific means illustrated for connecting the front and rear bottom plates and closing up the spaces at the ends of the feeding slot is left to the discretion of the constructor and has nothing to do with the principle of the invention.

It is to be understood that although I have shown what I at present deem the best embodiment of the invention I do not limit myself to the precise construction shown, but reserve the right to make minor changes such as fall within the scope of the appended claims.

I claim:

1. A can provided with two openings, one for refilling and the other for discharging, means guarding said discharge opening against refilling, a door for the refilling opening, there being an external groove in the can adjacent said door, and a rod for sealing said door in closed position, said rod having a bent end portion seated in said groove.

2. A receptacle for granular material having a flat bottom provided with a feeding slot therethrough, oppositely disposed upper and lower plates spaced apart thereabove and inclined to deliver material to said slot, an upright wall 14, closing the space between the lower portion of said upper plate and the adjacent edge of said slot, said upper plate projecting across the top of said wall, and a guarding flap pivoted to the lower edge of the lower plate at a point above the bottom of the box, said flap normally bridging the space between the lower plate and the bottom of the box, and swinging against the aforementioned projecting portion of the upper plate when the box is inverted.

3. A non-refillable feeding receptacle for granular material having a bottom provided with a feeding slot therethrough, oppositely disposed plates spaced apart above said bottom and inclined to deliver material to said slot, a guarding flap to prevent refilling pivoted to the lower edge of one of said plates, said flap normally bridging the space between such plate and the bottom of the canister at that side of the slot, and swinging against the other plate to prevent refilling when the canister is inverted.

In testimony whereof I have hereunto signed my name in the presence of two subscribing witnesses at Los Angeles, in the county of Los Angeles and State of California, this twelfth day of September 1907.

NEIL J. HARRINGTON.

Witnesses:
ALBERT H. MERRILL,
ETHEL M. KREUZ.